United States Patent
Kim

(10) Patent No.: US 12,456,760 B2
(45) Date of Patent: Oct. 28, 2025

(54) NON-AQUEOUS ELECTROLYTE SOLUTION FOR SODIUM ION SECONDARY BATTERY, AND SODIUM ION SECONDARY BATTERY

(71) Applicant: Mitsubishi Chemical Corporation, Tokyo (JP)

(72) Inventor: Jungmin Kim, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 456 days.

(21) Appl. No.: 17/445,966

(22) Filed: Aug. 26, 2021

(65) Prior Publication Data

US 2021/0391600 A1   Dec. 16, 2021

Related U.S. Application Data

(63) Continuation of application No. PCT/JP2020/008120, filed on Feb. 27, 2020.

(30) Foreign Application Priority Data

Feb. 28, 2019   (JP) ................................. 2019-035883

(51) Int. Cl.
| | |
|---|---|
| H01M 10/36 | (2010.01) |
| C07D 327/10 | (2006.01) |
| H01M 4/583 | (2010.01) |
| H01M 4/02 | (2006.01) |

(52) U.S. Cl.
CPC .......... H01M 10/36 (2013.01); C07D 327/10 (2013.01); H01M 4/583 (2013.01); *H01M 2004/021* (2013.01); *H01M 2300/0037* (2013.01)

(58) Field of Classification Search
CPC ...... H01M 4/583; H01M 10/36; C07D 327/10
USPC ........................................................ 429/326
See application file for complete search history.

(56) References Cited

U.S. PATENT DOCUMENTS

| | | | |
|---|---|---|---|
| 2012/0015256 A1 | 1/2012 | Komaba | |
| 2013/0071730 A1 | 3/2013 | Tokuda et al. | |
| 2013/0171514 A1 | 7/2013 | Mio et al. | |
| 2014/0255796 A1* | 9/2014 | Matsuoka | H01M 4/139 429/188 |
| 2016/0104889 A1* | 4/2016 | Kano | C01B 32/05 423/445 R |
| 2016/0359197 A1 | 12/2016 | Watarai et al. | |
| 2017/0204124 A1 | 7/2017 | Takahashi et al. | |
| 2018/0062174 A1 | 3/2018 | Takeshita et al. | |
| 2018/0375158 A1 | 12/2018 | Morinaka et al. | |
| 2020/0176817 A1* | 6/2020 | Dou | C07C 255/04 |
| 2022/0231340 A1* | 7/2022 | Barker | H01M 10/054 |

FOREIGN PATENT DOCUMENTS

| | | | | |
|---|---|---|---|---|
| CN | 102362386 A | 2/2012 | | |
| CN | 102893441 A | 1/2013 | | |
| CN | 105247713 A | 1/2016 | | |
| CN | 105633466 A | 6/2016 | | |
| CN | 106030889 A | 10/2016 | | |
| CN | 106920988 A | * 7/2017 | .......... | H01M 10/054 |
| CN | 107221443 A | 9/2017 | | |
| CN | 108321387 A | 7/2018 | | |
| JP | 2002-319430 A | 10/2002 | | |
| JP | 2017-107856 A | 5/2017 | | |
| JP | 2018-32588 A | 3/2018 | | |
| JP | 2019-46614 A | 3/2019 | | |
| WO | WO 2012/053644 A1 | 4/2012 | | |
| WO | WO 2014/188722 A1 | 11/2014 | | |
| WO | WO 2016/002774 A1 | 1/2016 | | |

(Continued)

OTHER PUBLICATIONS

International Search Report issued May 19, 2020 in PCT/JP2020/008120, 2 pages.
International Preliminary Report on Patentability and Written Opinion Issued Aug. 25, 2021 in PCT/JP2020/008120 (submitting English translation only), 5 pages.
Stevens, D.A., et al., "The Mechanisms of Lithium and Sodium Insertion in Carbon Materials", Journal of The Electrochemical Society, vol. 148, No. 8, 2001, pP. A803-A811 with cover page.

(Continued)

*Primary Examiner* — Jonathan G Leong
*Assistant Examiner* — John S Medley
(74) *Attorney, Agent, or Firm* — Oblon, McClelland, Maier &Neustadt, L.L.P.

(57) ABSTRACT

The present invention is aimed at providing: a non-aqueous electrolyte solution for a sodium ion secondary battery, with which a sodium ion secondary battery having a low resistance and showing a limited amount of gas generation after a durability test can be provided; and a sodium ion secondary battery obtained by using the same. The non-aqueous electrolyte solution for a sodium ion secondary battery comprises: a non-aqueous solvent; $NaPF_6$; and a compound represented by the following Formula (1) (wherein, $R_1$ and $R_2$ each independently represent a hydrogen atom or a hydrocarbon group having 1 to 6 carbon atoms, and n represents 0 or 1), and a ratio of the content of the compound represented by Formula (1) with respect to the content of $NaPF_6$, [compound represented by Formula (1)]/[$NaPF_6$] (molar ratio), is 0.001 to 1.5:

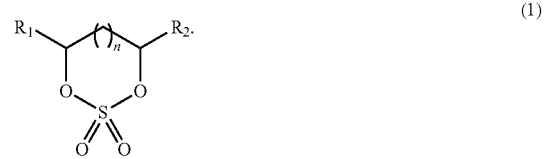

(1)

23 Claims, No Drawings

(56) References Cited

FOREIGN PATENT DOCUMENTS

| WO | WO 2017/111143 A1 | 6/2017 | | |
|----|---|---|---|---|
| WO | WO 2017/113234 A1 | 7/2017 | | |
| WO | WO 2017/190365 A1 | 11/2017 | | |
| WO | WO-2018232807 | * | 12/2018 | ........... C07C 255/04 |
| WO | WO-2020240209 A1 | * | 12/2020 | .......... H01M 10/054 |

OTHER PUBLICATIONS

Mogensen, R., et al., "Solubility of the Solid Electrolyte interphase (SEI) in Sodium Ion Batteries". ACS Energy Letters, 2016, vol. 1, pp. 1173-1178.
Combined Chinese Office Action and Search Report issued Oct. 9, 2023, in corresponding Chinese Patent Application No. 202080017025.6 (with English Translation), 23 pages.
Extended European Search Report issued Mar. 28, 2022, in corresponding European Patent Application No. 20763423.9, 9 pages.
Combined Chinese Office Action and Search Report issued Apr. 4, 2024 in Chinese Patent Application No. 202080017025.6 (with unedited computer-generated English translation), 22 pages.
Japanese Office Action issued Jan. 9, 2024 in Japanese Patent Application No. 2021-502378 (with unedited computer-generated English translation), 6 pages.
Decision of Refusal dated Jun. 25, 2024, issued in corresponding Japanese application No. 2021-502378 (with Machine Translation).
Reconsideration Report by Examiner before Appeal dated Dec. 2, 2024 issued in corresponding Japan Application No. 2021-502378 with Machine Translation.
M. Dahbi et al., "Effect of Hexafluorophosphate and Fluoroethylene Carbonate on Electrochemical Performance and the Surface Layer of Hard Carbon for Sodium-Ion Batteries", Chem, Electro. Chem, 2016, 3(11), p. 1856-1867.
Decision of Refusal dated Dec. 18, 2024 issued in corresponding Chinese Application No. 202080017025.6 with Machine Translation.
Office Action issued on Jul. 22, 2025, in Japanese Patent Application No. 2021-502378 (with machine-generated English translation) (10 pages).

* cited by examiner

NON-AQUEOUS ELECTROLYTE SOLUTION FOR SODIUM ION SECONDARY BATTERY, AND SODIUM ION SECONDARY BATTERY

CROSS REFERENCE TO RELATED APPLICATIONS

This application is a Continuation of PCT International Application No. PCT/JP2020/008120, filed on Feb. 27, 2020, which is claiming priority of Japanese Patent Application No. 2019-035883, filed on Feb. 28, 2019, the entire contents of which are incorporated herein by reference.

TECHNICAL FIELD

The present invention relates to a non-aqueous electrolyte solution for a sodium ion secondary battery, and a sodium ion secondary battery. More particularly, the present invention relates to a non-aqueous electrolyte solution for a sodium ion secondary battery, with which a sodium ion secondary battery having a low resistance and showing a limited amount of gas generation after a durability test can be provided.

BACKGROUND ART

There is an increasing demand for lithium ion secondary batteries, which are high-energy-density secondary batteries, as power sources of transport equipment, such as electric cars and electric motorcycles, as well as household and commercial large-sized power storage devices. In lithium ion secondary batteries, lithium ions are used as a charge carrier. However, lithium is a rare metal and thus has a problem of being scarce in production.

In recent years, sodium ion secondary batteries using sodium ions as a charge carrier have been studied. In contrast to lithium, sodium is abundant and can be obtained inexpensively; therefore, sodium is drawing attention for secondary batteries that are low-cost and can be provided in a large size. However, it is very difficult to realize a sodium ion secondary battery with adequate performance even if a material considered usable as a negative electrode active material of a lithium ion secondary battery is directly used as a negative electrode active material of a sodium ion secondary battery (Non-patent Document 1). In addition, it has been reported that the stability of a negative electrode coating film formed by reductive decomposition of a solvent during initial charging varies between a sodium ion secondary battery and a lithium ion secondary battery (Non-patent Document 2). From these reasons, it is considered necessary to develop an electrode material and an electrolyte solution that are suitable for sodium ion secondary batteries. In Patent Document 1, it is described that a high-capacity sodium ion secondary battery can be realized by using a non-graphitic carbon material, such as heat-treated activated carbon, as a negative electrode material of a sodium ion secondary battery.

Meanwhile, in electrolyte solutions for lithium ion secondary batteries, a variety of additives have been examined for performance improvement, and examples of the additives include lithium salt compounds, nitrile compounds, isocyanate compounds, ether compounds, carbonates, carboxylic acid esters, sulfonates, and sulfates. Patent Documents 2 and 3 disclose that, among such additives, sulfates can inhibit a reduction in capacity and a reduction in battery voltage during high-temperature storage of a non-aqueous electrolyte solution in lithium ion secondary batteries in which $LiCoO_2$ is used as a positive electrode and graphite is used as a negative electrode. Patent Document 4 describes the use of a cyclic sulfate as an additive of a non-aqueous electrolyte solution in a sodium ion secondary battery.

RELATED ART DOCUMENTS

Non-Patent Documents

[Non-patent Document 1] Journal of The Electrochemical Society, 148(8) A803-A811 (2001)
[Non-patent Document 2] ACS Energy Lett. 2016, 1, 1173-1178

Patent Documents

[Patent Document 1] WO 2014/188722
[Patent Document 2] Japanese Unexamined Patent Application Publication No. 2002-319430
[Patent Document 3] WO 2012/053644
[Patent Document 4] WO 2017/111143

SUMMARY OF THE INVENTION

Problems to be Solved by the Invention

According to the studies conducted by the present inventor, it was revealed that the use of a non-graphitic carbon material as a negative electrode material of a sodium ion secondary battery leads to an increase in the negative electrode resistance. In Patent Documents 2 to 4, however, a specific study was not conducted with regard to the effect of adding a cyclic sulfate in a sodium ion secondary battery.

The present invention was made in view of the above-described background art, and an object of the present invention is to provide: a non-aqueous electrolyte solution for a sodium ion secondary battery, with which a sodium ion secondary battery having a low resistance and showing a limited amount of gas generation after a durability test, i.e., a limited change in volume after a durability test, can be provided; and a sodium ion secondary battery obtained by using the same.

Means for Solving the Problems

The present inventor intensively studied to solve the above-described problems and consequently discovered that an effect of reducing the negative electrode resistance, which is not observed in a lithium ion secondary battery, is exerted by an addition of a cyclic sulfate in a sodium ion secondary battery. The present inventor also discovered that the above-described problems can be solved by using a sulfate compound and $NaPF_6$ at a specific ratio in a non-aqueous electrolyte solution for a sodium ion secondary battery. That is, the gist of the present invention resides in the following [1] to [6].

[1] A non-aqueous electrolyte solution for a sodium ion secondary battery, comprising: a non-aqueous solvent; $NaPF_6$; and a compound represented by the following Formula (1), wherein a ratio of the content of the compound represented by Formula (1) with respect to the content of $NaPF_6$, [compound represented by Formula (1)]/[$NaPF_6$] (molar ratio), is 0.001 to 1.5:

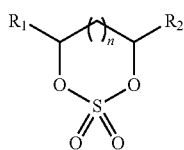

(1)

(wherein, $R_1$ and $R_2$ each independently represent a hydrogen atom or a hydrocarbon group having 1 to 6 carbon atoms, and n represents 0 or 1).

[2] The non-aqueous electrolyte solution for a sodium ion secondary battery according to [1], comprising the compound represented by Formula (1) in an amount of 0.01 parts by mass to 10 parts by mass with respect to 100 parts by mass of the non-aqueous solvent.

[3] The non-aqueous electrolyte solution for a sodium ion secondary battery according to [1] or [2], comprising 0.001 mol/L to 5.0 mol/L of $NaPF_6$ in the non-aqueous solvent.

[4] The non-aqueous electrolyte solution for a sodium ion secondary battery according to any one of [1] to [3], comprising a cyclic carbonate as the non-aqueous solvent.

[5] A sodium ion secondary battery, comprising: a positive electrode; a negative electrode; and an electrolyte solution, wherein the non-aqueous electrolyte solution for a sodium ion secondary battery according to any one of [1] to [4] is used as the electrolyte solution.

[6] The sodium ion secondary battery according to [5], wherein the negative electrode comprises porous carbon.

Effects of the Invention

According to the present invention, a non-aqueous electrolyte solution for a sodium ion secondary battery, with which a sodium ion secondary battery having a low resistance and showing a limited amount of gas generation after a durability test, i.e., a limited change in volume after a durability test, can be provided, as well as a sodium ion secondary battery obtained by using the same are provided.

Mode for Carrying Out the Invention

The present invention will now be described in detail. The following descriptions are merely examples (representative examples) of the present invention, and the present invention is not restricted thereto. Further, the present invention can be carried out with modifications as desired, without departing from the gist of the present invention.

[Non-Aqueous Electrolyte Solution for Sodium Ion Secondary Battery]

The non-aqueous electrolyte solution for a sodium ion secondary battery according to one embodiment of the present invention contains a non-aqueous solvent and a compound represented by the following Formula (1). Hereinafter, the non-aqueous electrolyte solution for a sodium ion secondary battery according to the present embodiment may be referred to as "non-aqueous electrolyte solution of the present embodiment", and the compound represented by Formula (1) may be simply referred to as "compound (1)".

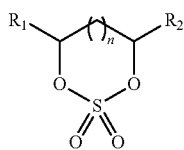

(1)

(wherein, $R_1$ and $R_2$ each independently represent a hydrogen atom or a hydrocarbon group having 1 to 6 carbon atoms, and n represents 0 or 1)

The non-aqueous electrolyte solution of the present embodiment exerts an effect of reducing the negative electrode resistance and the generation of a gas. The reason why this effect is exerted is not clear; however, it is presumed as follows. Formation of a negative electrode coating film is considered as an important factor that increases the negative electrode resistance and, in a lithium ion secondary battery, an organic coating film of lithium alkyl carbonate or the like is formed by reduction of an organic solvent such as ethylene carbonate. In this respect, it is believed that the reduction of an organic solvent does not stop in a sodium ion secondary battery, and this makes the generation of a gas likely to occur. It is also believed that an inorganic coating film, which is a high-resistant component such as sodium carbonate generated by reductive decomposition, is likely to be formed on the negative electrode. It is presumed that, in the above-described process of the formation of a negative electrode coating film in a sodium ion secondary battery, the use of a non-aqueous electrolyte solution containing a cyclic sulfate inhibits the reduction of the organic solvent and the formation of the inorganic coating film and decreases the generation of a gas, as a result of which the resistance of the negative electrode is lowered.

<1. Compound (1)>

The non-aqueous electrolyte solution used in the present embodiment comprises a compound represented by Formula (1). In Formula (1), $R_1$ and $R_2$ each independently represent a hydrogen atom or a hydrocarbon group having 1 to 6 carbon atoms, and n represents 0 or 1.

Among those compounds represented by Formula (1), for example, 1,3,2-dioxathiolane 2,2-dioxide, 4-methyl-1,3,2-dioxathiolane 2,2-dioxide, 4-vinyl-1,3,2-dioxathiolane 2,2-dioxide, 4-ethinyl-1,3,2-dioxathiolane 2,2-dioxide, 4,5-dimethyl-1,3,2-dioxathiolane 2,2-dioxide, 4-ethyl-1,3,2-dioxathiolane 2,2-dioxide, 4,4-dimethyl-1,3,2-dioxathiolane 2,2-dioxide, 4-propyl-1,3,2-dioxathiolane 2,2-dioxide, 4-(1-methylethyl)-1,3,2-dioxathiolane 2,2-dioxide, 4,5-diethyl-1,3,2-dioxathiolane 2,2-dioxide, 4-phenyl-1,3,2-dioxathiolane 2,2-dioxide, 4-cyclohexyl-1,3,2-dioxathiolane 2,2-dioxide, 4-hexyl-1,3,2-dioxathiolane 2,2-dioxide, 4-(3-buten-1-yl)-1,3,2-dioxathiolane 2,2-dioxide, 4-butyl-1,3,2-dioxathiolane 2,2-dioxide, 4-(1,1-dimethylethyl)-1,3,2-dioxathiolane 2,2-dioxide, 4-(1,1-dimethyl-2-propen-1-yl)-1,3,2-dioxathiolane 2,2-dioxide, 4-(3-methylbutyl)-1,3,2-dioxathiolane 2,2-dioxide, 4-cyclohexyl-5-methyl-1,3,2-dioxathiolane 2,2-dioxide, 4,5-dibutyl-1,3,2-dioxathiolane 2,2-dioxide, 4,5-diphenyl-1,3,2-dioxathiolane 2,2-dioxide, 1,3,2-dioxathiane 2,2-dioxide, 4-methyl-1,3,2-dioxathiane 2,2-dioxide, 5-methyl-1,3,2-dioxathiane 2,2-dioxide, 4,6-dimethyl-1,3,2-dioxathiane 2,2-dioxide, 4-ethyl-1,3,2-dioxathiane 2,2-dioxide, 4-propyl-1,3,2-dioxathiane 2,2-dioxide, and 4-butyl-1,3,2-dioxathiane 2,2-dioxide are preferred.

Thereamong, for example, 1,3,2-dioxathiolane 2,2-dioxide, 4-methyl-1,3,2-dioxathiolane 2,2-dioxide, 4-vinyl-1,3,2-dioxathiolane 2,2-dioxide, 4-ethinyl-1,3,2-dioxathiolane 2,2-dioxide, 4,5-dimethyl-1,3,2-dioxathiolane 2,2-dioxide, 4-ethyl-1,3,2-dioxathiolane 2,2-dioxide, 4,4-dimethyl-1,3,2-dioxathiolane 2,2-dioxide, 4-propyl-1,3,2-dioxathiolane 2,2-dioxide, 4-(1-methylethyl)-1,3,2-dioxathiolane 2,2-dioxide, 4,5-diethyl-1,3,2-dioxathiolane 2,2-dioxide, 1,3,2-dioxathiane 2,2-dioxide, 4-methyl-1,3,2-dioxathiane 2,2-dioxide, 5-methyl-1,3,2-dioxathiane 2,2-dioxide, 4,6-dimethyl-1,3,2-dioxathiane 2,2-dioxide, 4-ethyl-1,3,2-dioxathiane 2,2-dioxide, and 4-propyl-1,3,2-dioxathiane 2,2-dioxide are particularly preferred since these compounds have a low steric hinderance after reductive decomposition.

The content of the compound represented by Formula (1) in the non-aqueous electrolyte solution is not particularly restricted as long as the effects of the present invention are not markedly impaired. Specifically, a lower limit value of the content of the compound (1) is preferably not less than 0.01 parts by mass, more preferably not less than 0.05 parts by mass, still more preferably not less than 0.1 parts by mass, with respect to 100 parts by mass of the non-aqueous solvent. Further, an upper limit value is preferably 10 parts by mass or less, more preferably 5 parts by mass or less, still more preferably 3 parts by mass or less, with respect to 100 parts by mass of the non-aqueous solvent. When the concentration of this compound is in the above-described preferred range, an effect of reducing the initial negative electrode resistance is more likely to be exerted without deterioration of other battery performance.

<2. Non-Aqueous Solvent>

Similarly to a common non-aqueous electrolyte solution, the non-aqueous electrolyte solution of the present embodiment usually comprises, as its main component, a non-aqueous solvent that dissolves the below-described electrolytes. The non-aqueous solvent used in the non-aqueous electrolyte solution is not particularly restricted, and any known organic solvent can be used. The organic solvent is preferably, for example, but not particularly limited to: at least one selected from a saturated cyclic carbonate, a linear carbonate, a linear carboxylic acid ester, a cyclic carboxylic acid ester, an ether-based compound other than the compound (1), and a sulfone-based compound other than the compound (1). These organic solvents may be used singly, or in combination of two or more thereof.

<2-1. Saturated Cyclic Carbonate>

Examples of the saturated cyclic carbonate include those comprising an alkylene group having 2 to 4 carbon atoms. Specific examples of saturated cyclic carbonates having 2 to 4 carbon atoms include ethylene carbonate, propylene carbonate, and butylene carbonate. Thereamong, ethylene carbonate and propylene carbonate are preferred from the standpoint of improving the battery characteristics that is attributed to an increase in the degree of sodium ion dissociation. Any of these saturated cyclic carbonates may be used singly, or two or more thereof may be used in any combination at any ratio.

The content of the saturated cyclic carbonate is not particularly restricted and may be set arbitrarily as long as the effects of the present invention are not markedly impaired; however, when a single saturated cyclic carbonate is used alone, the lower limit of the content is usually not less than 3% by volume, preferably not less than 5% by volume, in 100% by volume of the non-aqueous solvent. By controlling the content of the saturated cyclic carbonate to be in this range, a decrease in the electrical conductivity caused by a reduction in the permittivity of the non-aqueous electrolyte solution is avoided, so that the high-current discharge characteristics, the stability to the negative electrode, and the cycle characteristics of a power storage device are all likely to be attained in favorable ranges. Meanwhile, the upper limit of the content of the saturated cyclic carbonate is usually 90% by volume or less, preferably 85% by volume or less, more preferably 80% by volume or less. By controlling the content of the saturated cyclic carbonate to be in this range, the viscosity of the non-aqueous electrolyte solution is kept in an appropriate range and a reduction in the ionic conductivity is inhibited, as a result of which the input-output characteristics of a power storage device can be further improved and the durability, such as cycle characteristics and storage characteristics, can be further enhanced, which is preferred.

<2-2. Linear Carbonate>

As the linear carbonate, one having 3 to 7 carbon atoms is preferred. Specific examples of the linear carbonate having 3 to 7 carbon atoms include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate. Thereamong, dimethyl carbonate, diethyl carbonate, di-n-propyl carbonate, diisopropyl carbonate, n-propyl isopropyl carbonate, ethyl methyl carbonate and methyl-n-propyl carbonate are preferred, and dimethyl carbonate, diethyl carbonate and ethyl methyl carbonate are particularly preferred.

Further, a fluorine atom-containing linear carbonate (hereinafter, may be simply referred to as "fluorinated linear carbonate") can be preferably used as well. The number of fluorine atoms in the fluorinated linear carbonate is not particularly restricted as long as it is one or more; however, it is usually 6 or less, preferably 4 or less. When the fluorinated linear carbonate has plural fluorine atoms, the fluorine atoms may be bound to the same carbon, or may be bound to different carbons. Examples of the fluorinated linear carbonate include fluorinated dimethyl carbonate derivatives, fluorinated ethyl methyl carbonate derivatives, and fluorinated diethyl carbonate derivatives.

Any of the above-described linear carbonates may be used singly, or two or more thereof may be used in any combination at any ratio.

The content of the linear carbonate is not particularly restricted; however, it is usually not less than 15% by volume, preferably not less than 20% by volume, more preferably not less than 25% by volume, but usually 90% by volume or less, preferably 85% by volume or less, more preferably 80% by volume or less, in 100% by volume of the non-aqueous solvent. By controlling the content of the linear carbonate to be in this range, the viscosity of the non-aqueous electrolyte solution is kept in an appropriate range and a reduction in the ionic conductivity is inhibited, as a result of which the input-output characteristics and the charge-discharge rate characteristics of a power storage device are likely to be attained in favorable ranges. Further, a decrease in the electrical conductivity caused by a reduction in the permittivity of the non-aqueous electrolyte solution is avoided, so that the input-output characteristics and the charge-discharge rate characteristics of a power storage device are likely to be attained in favorable ranges.

<2-3. Linear Carboxylic Acid Ester>

Examples of the linear carboxylic acid ester include those having a total of 3 to 7 carbon atoms in their respective structures. Specific examples of such linear carboxylic acid esters include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate. Thereamong, for example, methyl acetate, ethyl acetate, n-propyl acetate, n-butyl acetate, methyl propionate, ethyl propionate, n-propyl propionate, isopropyl propionate, methyl butyrate, and ethyl butyrate are preferred from the standpoints of improving the ionic conductivity through a reduction in the viscosity and inhibiting battery swelling in durability tests for cycle operation and storage.

<2-4. Cyclic Carboxylic Acid Ester>

Examples of the cyclic carboxylic acid ester include those having a total of 3 to 12 carbon atoms in their respective structures. Specific examples of such cyclic carboxylic acid esters include γ-butyrolactone, γ-valerolactone, γ-caprolactone, and ε-caprolactone. Thereamong, γ-butyrolactone is particularly preferred from the standpoint of improving the battery characteristics that is attributed to an increase in the degree of sodium ion dissociation.

<2-5. Ether-Based Compound Other Than Compound (1)>

The ether-based compound other than the compound (1) is preferably a linear ether having 3 to 10 carbon atoms, or a cyclic ether having 3 to 6 carbon atoms other than the compound (1).

Examples of the linear ether having 3 to 10 carbon atoms include diethyl ether, di(2-fluoroethyl)ether, di(2,2-difluoroethyl)ether, di(2,2,2-trifluoroethyl)ether, ethyl(2-fluoroethyl) ether, ethyl(2,2,2-trifluoroethyl)ether, ethyl(1,1,2,2-tetrafluoroethyl)ether, (2-fluoroethyl) (2,2,2-trifluoroethyl) ether, (2-fluoroethyl) (1,1,2,2-tetrafluoroethyl)ether, (2,2,2-trifluoroethyl) (1,1,2,2-tetrafluoroethyl)ether, ethyl-n-propyl ether, ethyl(3-fluoro-n-propyl)ether, ethyl(3,3,3-trifluoro-n-propyl)ether, ethyl(2,2,3,3-tetrafluoro-n-propyl)ether, ethyl (2,2,3,3,3-pentafluoro-n-propyl)ether, 2-fluoroethyl-n-propyl ether, (2-fluoroethyl) (3-fluoro-n-propyl)ether, (2-fluoroethyl) (3,3,3-trifluoro-n-propyl)ether, (2-fluoroethyl)(2,2,3,3-tetrafluoro-n-propyl)ether, (2-fluoroethyl) (2,2,3,3,3-pentafluoro-n-propyl)ether, 2,2,2-trifluoroethyl-n-propyl ether, (2,2,2-trifluoroethyl) (3-fluoro-n-propyl) ether, (2,2,2-trifluoroethyl) (3,3,3-trifluoro-n-propyl)ether, (2,2,2-trifluoroethyl) (2,2,3,3-tetrafluoro-n-propyl)ether, (2,2,2-trifluoroethyl) (2,2,3,3,3-pentafluoro-n-propyl)ether, 1,1,2,2-tetrafluoroethyl-n-propyl ether, (1,1,2,2-tetrafluoroethyl) (3-fluoro-n-propyl)ether, (1,1,2,2-tetrafluoroethyl) (3,3,3-trifluoro-n-propyl)ether, (1,1,2,2-tetrafluoroethyl) (2,2,3,3-tetrafluoro-n-propyl)ether, (1,1,2,2-tetrafluoroethyl) (2,2,3,3,3-pentafluoro-n-propyl)ether, di-n-propyl ether, (n-propyl) (3-fluoro-n-propyl)ether, (n-propyl) (3,3,3-trifluoro-n-propyl)ether, (n-propyl) (2,2,3,3-tetrafluoro-n-propyl)ether, (n-propyl) (2,2,3,3,3-pentafluoro-n-propyl) ether, di(3-fluoro-n-propyl)ether, (3-fluoro-n-propyl) (3,3,3-trifluoro-n-propyl)ether, (3-fluoro-n-propyl) (2,2,3,3-tetrafluoro-n-propyl)ether, (3-fluoro-n-propyl) (2,2,3,3,3-pentafluoro-n-propyl)ether, di(3,3,3-trifluoro-n-propyl) ether, (3,3,3-trifluoro-n-propyl) (2,2,3,3-tetrafluoro-n-propyl)ether, (3,3,3-trifluoro-n-propyl) (2,2,3,3,3-pentafluoro-n-propyl)ether, di(2,2,3,3-tetrafluoro-n-propyl) ether, (2,2,3,3-tetrafluoro-n-propyl) (2,2,3,3,3-pentafluoro-n-propyl)ether, di(2,2,3,3,3-pentafluoro-n-propyl)ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy) methane, diethoxymethane, ethoxy(2-fluoroethoxy) methane, ethoxy(2,2,2-trifluoroethoxy)methane, ethoxy(1,1,2,2-tetrafluoroethoxy)methane, di(2-fluoroethoxy)methane, (2-fluoroethoxy) (2,2,2-trifluoroethoxy)methane, (2-fluoroethoxy) (1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy) ethane, methoxy(2,2,2-trifluoroethoxy)ethane, methoxy(1,1,2,2-tetrafluoroethoxy) ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethyl)ethane, (2-fluoroethoxy) (2,2,2-trifluoroethoxy) ethane, (2-fluoroethoxy) (1,1,2,2-tetrafluoroethoxy)ethane, di(2,2,2-trifluoroethoxy)ethane, (2,2,2-trifluoroethoxy) (1,1,2,2-tetrafluoroethoxy)ethane, di(1,1,2,2-tetrafluoroethoxy) ethane, ethylene glycol di-n-propyl ether, ethylene glycol di-n-butyl ether, and diethylene glycol dimethyl ether.

Examples of the cyclic ether having 3 to 6 carbon atoms other than the compound (1) include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane, and fluorinated compounds thereof. Thereamong, dimethoxymethane, diethoxymethane, ethoxymethoxymethane, ethylene glycol di-n-propyl ether, ethylene glycol di-n-butyl ether, and diethylene glycol dimethyl ether are preferred since they have a high solvating capacity with sodium ions and thus improve the sodium ion dissociation. Particularly preferred are dimethoxymethane, diethoxymethane, and ethoxymethoxymethane since they have a low viscosity and provide a high ionic conductivity.

<2-6. Sulfone-Based Compound Other Than Compound (1)>

The sulfone-based compound other than the compound (1) is preferably a cyclic sulfone having 3 to 6 carbon atoms other than the compound (1), or a linear sulfone having 2 to 6 carbon atoms. The number of sulfonyl groups in one molecule is preferably 1 or 2.

Examples of the cyclic sulfone other than the compound (1) include: monosulfone compounds, such as trimethylene sulfones, tetramethylene sulfones, and hexamethylene sulfones; and disulfone compounds, such as trimethylene disulfones, tetramethylene disulfones, and hexamethylene disulfones. Thereamong, from the standpoints of the permittivity and the viscosity, tetramethylene sulfones, tetramethylene disulfones, hexamethylene sulfones and hexamethylene disulfones are more preferred, and tetramethylene sulfones (sulfolanes) are particularly preferred.

As the sulfolanes, sulfolane and sulfolane derivatives (hereinafter, may be simply referred to as "sulfolanes", including sulfolane) are preferred. As the sulfolane derivatives, those in which one or more hydrogen atoms bound to carbon atoms constituting a sulfolane ring are each substituted with a fluorine atom or an alkyl group are preferred.

Among such sulfolane derivatives, for example, 2-methyl sulfolane, 3-methyl sulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methyl sulfolane, 2-fluoro-2-methyl sulfolane, 3-fluoro-3-methyl sulfolane, 3-fluoro-2-methyl sulfolane, 4-fluoro-3-methyl sulfolane, 4-fluoro-2-methyl sulfolane, 5-fluoro-3-methyl sulfolane, 5-fluoro-2-methyl sulfolane, 2-fluoromethyl sulfolane, 3-fluoromethyl sulfolane, 2-difluoromethyl sulfolane, 3-difluoromethyl sulfolane, 2-trifluoromethyl sulfolane, 3-trifluoromethyl sulfolane, 2-fluoro-3-(trifluoromethyl)sulfolane, 3-fluoro-3-(trifluoromethyl) sulfolane, 4-fluoro-3-(trifluoromethyl) sulfolane, and 5-fluoro-3-(trifluoromethyl)sulfolane are preferred from the standpoint of attaining a high ionic conductivity and a high input/output.

Examples of the linear sulfone include dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butyl methyl sulfone, n-butyl ethyl sulfone, t-butyl methyl sulfone, t-butyl ethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoroethyl sulfone, ethyl pentafluoroethyl sulfone, di(trifluoroethyl)sulfone, perfluorodiethyl sulfone, fluoromethyl-n-propyl sulfone, difluoromethyl-n-propyl sulfone, trifluoromethyl-n-propyl sulfone, fluoromethyl isopropyl sulfone, difluoromethyl isopropyl sulfone, trifluoromethyl isopropyl sulfone, trifluoroethyl-n-propyl sulfone, trifluoroethyl isopropyl sulfone, pentafluoroethyl-n-propyl sulfone, pentafluoroethyl isopropyl sulfone, trifluoroethyl-n-butyl sulfone, trifluoroethyl-t-butyl sulfone, pentafluoroethyl-n-butyl sulfone, and pentafluoroethyl-t-butyl sulfone.

Thereamong, for example, dimethyl sulfone, ethyl methyl sulfone, diethyl sulfone, n-propyl methyl sulfone, isopropyl methyl sulfone, n-butyl methyl sulfone, t-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl-n-propyl sulfone, trifluoromethyl isopropyl sulfone, trifluoroethyl-n-butyl sulfone, trifluoroethyl-t-butyl sulfone, trifluoromethyl-n-butyl sulfone, and trifluoromethyl-t-butyl sulfone are preferred from the standpoint of attaining a high ionic conductivity and a high input/output.

<3. Electrolyte>

The non-aqueous electrolyte solution of the present embodiment comprises $NaPF_6$. $NaPF_6$ is required for ensuring the conductivity of sodium ions in the non-aqueous solvent.

<3-1. $NaPF_6$>

In the present embodiment, $NaPF_6$ is used such that a ratio of the content of the compound represented by Formula (1) with respect to the content of $NaPF_6$, [compound represented by Formula (1)]/[$NaPF_6$] (molar ratio), is in a range of 0.001 or more and 1.5 or less. An excessively high or low value of this ratio leads to a high battery resistance and an increased gas generation after a durability test. From the standpoint of improving these battery characteristics, the ratio [compound represented by Formula (1)]/[$NaPF_6$] (molar ratio) is preferably 0.003 or higher, more preferably 0.005 or higher, still more preferably 0.007 or higher, but preferably 1.4 or lower, more preferably 1.3 or lower.

Further, the content of $NaPF_6$ with respect to the non-aqueous solvent is preferably not less than 0.001 mol/L, more preferably not less than 0.01 mol/L, still more preferably not less than 0.1 mol/L, particularly preferably not less than 0.5 mol/L, but preferably 5.0 mol/L or less, more preferably 4.0 mol/L or less, still more preferably 3.0 mol/L or less, particularly preferably 2.0 mol/L or less.

<3-2. Other Sodium Salts>

In the non-aqueous electrolyte solution of the present embodiment, for the purpose of improving the battery performance through improvement of the capacity retention rate, inhibition of the gas generation, reduction in the battery internal resistance and the like, the below-described other sodium salt(s) can be used in addition to $NaPF_6$. Examples of the other sodium salts include, but not particularly limited to: $NaClO_4$, $NaBF_4$, $NaAlF_4$, $NaShF_6$, $NaTaF_6$, $NaWOF_5$, $NaWF_7$, $HCO_2Na$, $CH_3CO_2Na$, $CH_2FCO_2Na$, $CHF_2CO_2Na$, $CF_3CO_2Na$, $CF_3CH_2CO_2Na$, $CF_3CF_2CO_2Na$, $CF_3CF_2CF_2CO_2Na$, $CF_3CF_2CF_2CF_2CO_2Na$, $CH_3SO_3Na$, $FSO_3Na$, sodium methyl sulfate, sodium ethyl sulfate, sodium 2-propynyl sulfate, sodium 1-methyl-2-propynyl sulfate, sodium 1,1-dimethyl-2-propynyl sulfate, sodium 2,2,2-trifluoroethyl sulfate, disodium ethylene disulfate, $NaC(SO_2F)_3$, $NaC(CF_3SO_2)_3$, $NaC(C_2F_5SO_2)_3$, $Na(FSO_2)_2N$, $Na(CF_3SO_2)_2N$, $Na(C_2F_5SO_2)_2N$, $NaBF_3CF_3$, $NaBF_3C_2F_5$, $NaBF_3C_3F_7$, $NaBF_2(CF_3)_2$, $NaBF_2(C_2F_5)_2$, $NaBF_2(CF_3SO_2)_2$, $NaBF_2(C_2F_5SO_2)_2$, $NaPO_2F_2$, $NaPO_3F$, $NaPF_4(C_2O_4)$, $NaPF_2(C_2O_4)_2$, $NaP(C_2O_4)_3$, $NaBF_2(C_2O_4)_f$ and $NaB(C_2O_4)_2$, and these sodium salts may be used singly, or in combination of two or more thereof.

Among these sodium salts, for example, $NaPO_2F_2$, $NaPO_3F$, $NaPF_2(C_2O_4)_2$, $NaB(C_2O_4)_2$, $FSO_3Na$, and $Na(FSO_2)_2N$ are preferred from the standpoint of the effects of improving the battery performance through improvement of the capacity retention rate, inhibition of the gas generation, reduction in the battery internal resistance and the like.

When other sodium salt is used, the content thereof is not particularly restricted as long as the effects of the present invention are not markedly impaired. Specifically, a lower limit of the content of the other sodium salt is preferably not less than 0.01° by mass, more preferably not less than 0.05% by mass, still more preferably not less than 0.1% by mass, based on a total amount of the non-aqueous electrolyte solution. Meanwhile, an upper limit is preferably 10% by mass or less, more preferably 5% by mass or less, still more preferably 2% by mass or less, based on a total amount of the non-aqueous electrolyte solution. In the non-aqueous electrolyte solution, a total concentration of all of the above-exemplified other sodium salts is not particularly restricted; however, it is preferred to be in the above-described range since the battery performance is to be well balanced through, for example, improvement of the capacity retention rate, inhibition of the gas generation, and reduction in the battery internal resistance.

4. Other Additives

In the non-aqueous electrolyte solution of the present embodiment, in addition to the above-described compounds, a variety of additives, examples of which include: storage characteristics-improving agents, for example, cyano group-containing compounds such as malononitrile, succinonitrile, glutaronitrile, adiponitrile, pimelonitrile, suberonitrile, azelanitrile, sebaconitrile, undecanedinitrile, and dodecanedinitrile; negative electrode protectants, for example, diisocyanate compounds such as 1,3-bis(isocyanatomethyl)cyclohexane, 1,4-bis(isocyanatomethyl)cyclohexane, 1,3-phenylene diisocyanate, 1,4-phenylene diisocyanate, 1,2-bis(isocyanatomethyl)benzene, 1,3-bis(isocyanatomethyl)benzene, and 1,4-bis(isocyanatomethyl)benzene; durability improvers, for example, carboxylic anhydride compounds such as acrylic anhydride, 2-methylacrylic anhydride, 3-methylacrylic anhydride, benzoic anhydride, 2-methylbenzoic anhydride, 4-methylbenzoic anhydride, 4-tert-butylbenzoic anhydride, 4-fluorobenzoic anhydride, 2,3,4,5,6-pentafluorobenzoic anhydride, methoxyformic anhydride, and ethoxyformic anhydride; and overcharge inhibitors, such as cyclohexylbenzene, t-butylbenzene, t-amylbenzene, biphenyl, alkylbiphenyls, terphenyl, partially hydrogenated terphenyl, diphenyl ether, and dibenzofuran, can be incorporated within a range that does not markedly impair the effects of the present invention. These compounds may be used in combination as appropriate.

[Sodium Ion Secondary Battery]

A sodium ion secondary battery can be produced by using the above-described non-aqueous electrolyte solution, a positive electrode, and a negative electrode (this sodium ion secondary battery is hereinafter also referred to as "sodium ion secondary battery of the present embodiment"). The sodium ion secondary battery of the present embodiment usually includes: the above-described non-aqueous electrolyte solution; a positive electrode, which has a current collector and a positive electrode active material layer formed on the current collector and is capable of occluding and releasing sodium ions; and a negative electrode, which has a current collector and a negative electrode active material layer formed on the current collector and is capable of occluding and releasing sodium ions.

<1. Positive Electrode>

The positive electrode used in the sodium ion secondary battery of the present embodiment usually contains a composite oxide, a polyanionic compound, a fluoride and the like. The positive electrode usually has a positive electrode active material layer on a current collector, and this positive electrode active material layer contains a positive electrode active material. The positive electrode active material will now be described.

Examples of the composite oxide include those represented by the following Formula (2):

$$Na_xM^1_{1-y}M^2_yO_2 \qquad (2)$$

In Formula (2), 0<x<1.2 and 0<y<1.

In Formula (2), $M^2$ represents a transition metal which is preferably Mn, Fe, Co, or Ni. The composite oxide may contain only a single kind of $M^1$ in Formula (2), or plural different kinds of $M^1$s in Formula (2).

In Formula (2), $M^2$ represents at least one selected from V, Fe, Cu, Nb, Mo, Ta, W, Zn, Ti, Zr, Al, B, Mg, Li, Na, and K. Thereamong, from the standpoint of improving the output, $M^2$ is preferably at least one selected from V, Fe, Cu, Nb, Mo, Ta, and W, more preferably at least one selected from Nb, Mo, Ta, and W. Meanwhile, from the standpoint of the capacity retention rate after a durability test, $M^2$ is preferably at least one selected from Zn, Ti, Zr, Al, B, Mg, Li, Na, and K, more preferably at least one selected from Zr, Al, Mg, and Li.

Examples of a preferred composite oxide include $Na_{2/3}Fe_{1/2}Mn_{1/2}O_2$, $Na_{2/3}Ni_{1/2}Mn_{1/2}O_2$, $Na_{2/3}Ni_{1/3}Mn_{2/3}O_2$, $Na_{4/5}Ni_{1/3}Mn_{2/3}O_2$, $NaCoO_2$, $NaCrO_2$, $NaNi_{1/3}Co_{1/3}Mn_{1/3}O_2$, and $NaNi_{1/3}Fe_{1/3}Mn_{1/3}O_2$.

Examples of the polyanionic compound include those represented by the following Formula (3):

$$Na_xM'_{y'}(QO_4)_z \qquad (3)$$

In Formula (3), 1<x'<2, 1<y'<3, and 1<z<3.

In Formula (3), M' represents a transition metal which is preferably Mn, Fe, Co, or Ni. The polyanionic compound may contain only a single kind of M' in Formula (3), or plural different kinds of M's in Formula (3).

In Formula (3), Q represents at least one selected from P, As, Sb, Bi, S, Se, Te, Po, Si, Ge, Sn, and Pb. Thereamong, from the standpoint of the stability of the compound, Q is preferably at least one selected from P, S, and Si, more preferably at least one selected from P and S.

Examples of a preferred polyanionic compound include $NaFePO_4$, $Na_2Fe_3(PO_4)_3$, $Na_2Fe_2(SO_4)_3$, $Na_2Fe_2(SiO_4)_3$, $NaMnPO_4$, $NaMnFe3(PO_4)_3$, $Na_2Mn_2(SO_4)_3$, and $Na_2Mn_2(SiO_4)_3$.

The above-described fluoride is, for example, $NaM"F_3$ or $Na_2M"PO_4F$ (wherein, M" represents a transition metal which is preferably Mn, Fe, Co, or Ni, and only a single kind of M" or plural different kinds of M"s may be contained). Examples of such a fluoride include $NaFeF_3$, $Na_2FePO_4F$, $NaFMnF_3$, $Na_2MnPO_4F$, $NaFNiF_3$, and $Na_2NiPO_4F$.

The positive electrode used in the present embodiment is preferably a positive electrode which contains a composite oxide, a polyaniline compound, and a fluoride among the above-exemplified compounds, and may further contain other positive electrode active material as long as it does not inhibit the effects of the present invention. The other positive electrode active material is not particularly restricted as long as it does not correspond to any of the above-described composite oxides, polyanionic compounds and fluorides and is capable of electrochemically occluding and releasing s-block metal ions. The other positive electrode active material is preferably, for example, a substance containing an alkali metal and at least one transition metal, and specific examples thereof include sodium-transition metal composite oxides, sodium-containing transition metal phosphate compounds, and sodium-containing transition metal silicate compounds, such as $Na_2FeP_2O_7$ and $Na_4Fe_3(PO_4)_2(P_2O_7)$. These other positive electrode active materials may be used singly, or in combination of two or more thereof.

<2. Negative Electrode>

The negative electrode usually has a negative electrode active material layer on a current collector, and this negative electrode active material layer contains a negative electrode active material. The negative electrode active material will now be described.

The negative electrode active material is not particularly restricted as long as it is capable of electrochemically occluding and releasing s-block metal ions, such as lithium ions, sodium ions, potassium ions, and magnesium ions. Specific examples of the negative electrode active material include carbonaceous materials, metal alloy-based materials, and s-block metal-containing composite metal oxide materials. These negative electrode active materials may be used singly, or two or more thereof may be used in any combination.

Examples of the carbonaceous material used in the negative electrode active material include natural graphite, non-graphitizable carbon, and artificial carbonaceous substances, and the negative electrode active material is not particularly restricted as long as it usually has a pore structure (porous structure) that can be intercalated and de-intercalated with sodium ions. Specifically, the porous carbon material disclosed in WO2014/188722 (Patent Document 1) is preferred from the standpoint of attaining a high capacity. The term "porous carbon material" used herein refers to a carbon material having plural open pores that are in communication with the surface, plural closed pores that are not in communication with the surface, and a solid portion made of a carbon material. The distance between carbon (002) planes may be 0.36 nm or more and 0.41 nm or less in at least a part of the solid portion. Further, the volume ratio of the plural closed pores may be 30% or more and 90% or less with respect to a total volume of the plural open pores, the plural closed pores, and the solid portion.

<3. Separator>

A separator is usually arranged between the positive electrode and the negative electrode for the purpose of inhibiting a short circuit. In this case, the separator is usually impregnated with the non-aqueous electrolyte solution of the present invention.

The material and the shape of the separator are not particularly restricted, and any known material and shape can be employed as long as the separator does not markedly impair the effects of the present invention. Particularly, a separator formed from a material stable against the non-aqueous electrolyte solution of the present embodiment, such as a resin, a glass fiber or an inorganic material, can be used, and it is preferred to use a separator in the form of, for example, a porous sheet or nonwoven fabric that has excellent liquid retainability.

As the material of a resin or glass fiber separator, for example, polyolefins such as polyethylene and polypropylene, polytetrafluoroethylenes, polyether sulfones, and glass filters can be used. Thereamong, glass filters and polyolefins are preferred, and polyolefins are more preferred. Any of these materials may be used singly, or two or more thereof may be used in any combination at any ratio.

The separator may have any thickness; however, the thickness is usually 1 μm or greater, preferably 5 μm or greater, more preferably 10 μm or greater, but usually 50 μm or less, preferably 40 μm or less, more preferably 30 μm or less. When the separator is overly thinner than this range, the insulation and the mechanical strength may be decreased. Meanwhile, when the separator is overly thicker than this range, not only the battery performance such as the rate characteristics may be deteriorated, but also the energy density of a power storage device as a whole may be decreased.

In cases where a porous material such as a porous sheet or a nonwoven fabric is used as the separator, the porosity of the separator may be set arbitrarily; however, it is usually 20% or higher, preferably 35% or higher, more preferably 45% or higher, but usually 90% or lower, preferably 85% or lower, more preferably 75% or lower. When the porosity is overly lower than this range, the membrane resistance is increased, and this tends to deteriorate the rate characteristics. Meanwhile, when the porosity is overly higher than this range, the mechanical strength and the insulation of the separator tend to be decreased.

The average pore size of the separator may also be set arbitrarily; however, it is usually 0.5 μm or smaller, preferably 0.2 μm or smaller, but usually 0.05 μm or larger. When the average pore size is larger than this range, a short circuit is likely to occur. Meanwhile, when the average pore size is smaller than this range, the membrane resistance is increased, and this may lead to deterioration of the rate characteristics.

As the material of an inorganic separator, for example, an oxide such as alumina or silicon dioxide, a nitride such as aluminum nitride or silicon nitride, or a sulfate such as barium sulfate or calcium sulfate can be used, and the inorganic separator may be in the form of particles or fibers.

With regard to the shape of the separator, the separator may have a shape of a thin film, such as a nonwoven fabric, a woven fabric or a microporous film. As a thin-film separator, one having a pore size of 0.01 to 1 μm and a thickness of 5 to 50 μm is preferably used. Aside from such an independent thin-film separator, a separator that is formed as, with the use of a resin binder, a composite porous layer containing particles of the above-described inorganic material on the surface layer of the positive electrode and/or the negative electrode, can be used. For example, on both sides of the positive electrode, a porous layer may be formed using alumina particles having a 90% particle size of smaller than 1 μm along with a fluorine resin as a binder.

<4. Conductive Material>

The positive electrode and the negative electrode may contain a conductive material for improvement of the electrical conductivity. As the conductive material, any known conductive material can be used. Specific examples thereof include: metal materials, such as copper and nickel; and carbonaceous materials, such as graphites (e.g., natural graphites and artificial graphites), carbon blacks (e.g., acetylene black), and amorphous carbon (e.g., needle coke). Any of these conductive materials may be used singly, or two or more thereof may be used in any combination at any ratio.

The conductive material is used such that it is incorporated in an amount of usually not less than 0.01 parts by mass, preferably not less than 0.1 parts by mass, more preferably not less than 1 part by mass, but usually 50 parts by mass or less, preferably 30 parts by mass or less, more preferably 15 parts by mass or less, with respect to 100 parts by mass of the positive electrode material or the negative electrode material. When the content of the conductive material is lower than this range, the electrical conductivity may be insufficient. Meanwhile, when the content of the conductive material is higher than this range, the battery capacity may be decreased.

<5. Binder>

The positive electrode and the negative electrode may contain a binder for improvement of the bindability. The binder is not particularly restricted as long as it is a material that is stable against the non-aqueous electrolyte solution and the solvent used in the electrode production.

When a coating method is employed, the binder may be any material that is dissolved or dispersed in a liquid medium used in the electrode production, and specific examples of such a binder include: resin-based polymers, such as polyethylene, polypropylene, polyethylene terephthalate, polymethyl methacrylate, aromatic polyamide, cellulose, and nitrocellulose; rubbery polymers, such as SBR (styrene-butadiene rubbers), NBR (acrylonitrile-butadiene rubbers), fluororubbers, isoprene rubbers, butadiene rubbers, and ethylene-propylene rubbers; thermoplastic elastomeric polymers, such as styrene-butadiene-styrene block copolymers and hydrogenation products thereof, EPDM (ethylene-propylene-diene terpolymers), styrene-ethylene-butadiene-ethylene copolymers, styrene-isoprene-styrene block copolymers, and hydrogenation products thereof; soft resinous polymers, such as syndiotactic 1,2-polybutadiene, polyvinyl acetate, ethylene-vinyl acetate copolymers, and propylene-α-olefin copolymers; fluorine-based polymers, such as polyvinylidene fluoride (PVdF), polytetrafluoroethylene, fluorinated polyvinylidene fluoride, and polytetrafluoroethylene-ethylene copolymers; and polymer compositions having ionic conductivity for alkali metal ions (particularly sodium ions). Any of these substances may be used singly, or two or more thereof may be used in any combination at any ratio.

The ratio of the binder is usually 0.1 parts by mass or higher, preferably 1 part by mass or higher, more preferably 3 parts by mass or higher, but usually 50 parts by mass or lower, preferably 30 parts by mass or lower, more preferably 10 parts by mass or lower, still more preferably 8 parts by mass or lower, with respect to 100 parts by mass of the positive electrode material or the negative electrode material. When the ratio of the binder is in this range, the bindability of the respective electrodes can be sufficiently maintained, so that the mechanical strength of the electrodes can be ensured, which is preferred from the standpoints of the cycle characteristics, the battery capacity, and the electrical conductivity.

<6. Liquid Medium>

The type of a liquid medium used for the formation of a slurry is not particularly restricted as long as it is a solvent that is capable of dissolving or dispersing the active materials, the conductive material and the binder as well as a thickening agent used as required, and either an aqueous solvent or an organic solvent may be used.

Examples of the aqueous medium include water, and mixed media of alcohol and water. Examples of the organic medium include: aliphatic hydrocarbons, such as hexane; aromatic hydrocarbons, such as benzene, toluene, xylene, and methylnaphthalene; heterocyclic compounds, such as quinoline and pyridine; ketones, such as acetone, methyl ethyl ketone, and cyclohexanone; esters, such as methyl acetate and methyl acrylate; amines, such as diethylenetriamine and N,N-dimethylaminopropylamine; ethers, such as diethyl ether and tetrahydrofuran (THF); amides, such as N-methylpyrrolidone (NMP), dimethylformamide, and dimethylacetamide; and aprotic polar solvents, such as hexamethylphosphoramide and dimethyl sulfoxide. Any of these media may be used singly, or two or more thereof may be used in any combination at any ratio.

<7. Thickening Agent>

When an aqueous medium is used as the liquid medium for the formation of a slurry, it is preferred to prepare the slurry using a thickening agent and a latex such as a styrene-butadiene rubber (SBR). The thickening agent is usually used for the purpose of adjusting the viscosity of the resulting slurry.

The thickening agent is not particularly restricted as long as it does not markedly limit the effects of the present invention, and specific examples of the thickening agent include carboxymethyl cellulose, methyl cellulose, hydroxymethyl cellulose, ethyl cellulose, polyvinyl alcohol, oxidized starch, phosphorylated starch, casein, and salts thereof. Any of these thickening agents may be used singly, or two or more thereof may be used in any combination at any ratio.

In cases where a thickening agent is used, it is desired that the amount thereof be usually not less than 0.1 parts by mass, preferably not less than 0.5 parts by mass, more preferably not less than 0.6 parts by mass, but usually 5 parts by mass or less, preferably 3 parts by mass or less, more preferably 2 parts by mass or less, with respect to 100 parts by mass of the positive electrode material or the negative electrode material. When the amount of the thickening agent is less than this range, the coatability may be markedly decreased, while when the amount of the thickening agent is greater than this range, a decrease in the ratio of the active material in an active material layer may cause a decrease in the battery capacity and an increase in the resistance between the active materials.

<8. Current Collector>

The material of the current collector is not particularly restricted, and any known material can be used. Specific examples thereof include: metal materials, such as aluminum, stainless steel, nickel-plated steel, titanium, tantalum, and copper; and carbonaceous materials, such as carbon cloth and carbon paper. Thereamong, a metal material, particularly aluminum, is preferred.

When the current collector is a metal material, the current collector may have any shape of, for example, a metal foil, a metal cylinder, a metal coil, a metal sheet, a metal thin film, an expanded metal, a punched metal, and a foamed metal and, when the current collector is a carbonaceous material, examples thereof include a carbon sheet, a carbon thin film, and a carbon cylinder. Thereamong, the current collector is preferably a metal thin film. The current collector may be in the form of a mesh as appropriate.

The current collector may have any thickness; however, the thickness is usually 1 µm or greater, preferably 3 µm or greater, more preferably 5 µm or greater, but usually 1 mm or less, preferably 100 µm or less, more preferably 50 µm or less. When the thickness of the thin film is in this range, a sufficient strength required as a current collector is maintained, and this is also preferred from the standpoint of the ease of handling.

<9. Battery Design>

[Electrode Group]

An electrode group may have either a layered structure in which the above-described positive electrode plate and negative electrode plate are layered with the above-described separator being interposed therebetween, or a wound structure in which the above-described positive electrode plate and negative electrode plate are spirally wound with the above-described separator being interposed therebetween. The volume ratio of the electrode group with respect to the internal volume of the battery (this volume ratio is hereinafter referred to as "electrode group occupancy") is usually 40° or higher, preferably 50% or higher, but usually 90% or lower, preferably 80% or lower. When the electrode group occupancy is lower than this range, the battery has a small capacity. Meanwhile, when the electrode group occupancy is higher than this range, since the void space is small, there are cases where an increase in the battery temperature causes swelling of members and an increase in the vapor pressure of the electrolyte liquid component, as a result of which the internal pressure is increased to deteriorate various properties of the battery, such as charge-discharge repeating performance and high-temperature storage characteristics, and to activate a gas release valve for relieving the internal pressure to the outside.

[Current Collector Structure]

A current collector structure is not particularly restricted; however, in order to more effectively realize an improvement in the discharge characteristics attributed to the non-aqueous electrolyte solution of the present invention, it is preferred to adopt a structure that decreases the resistance of wiring and joint parts. By decreasing the internal resistance in this manner, the effects of using the non-aqueous electrolyte solution of the present invention are particularly favorably exerted.

In an electrode group having the above-described layered structure, the metal core portions of the respective electrode layers are preferably bundled and welded to a terminal. When the area of a single electrode is large, the internal resistance is high; therefore, it is also preferred to reduce the resistance by arranging plural terminals in each electrode. In an electrode group having the above-described wound structure, the internal resistance can be reduced by arranging plural lead structures on each of the positive electrode and the negative electrode and bundling them to a terminal.

[Outer Casing]

The material of an outer casing is not particularly restricted as long as it is a substance that is stable against the non-aqueous electrolyte solution to be used. Specifically, a metal such as a nickel-plated steel sheet, stainless steel, aluminum, an aluminum alloy or a magnesium alloy, or a layered film (laminated film) composed of a resin and an aluminum foil can be used. From the standpoint of decreasing weight, it is preferred to use a metal such as aluminum or an aluminum alloy, or a laminated film.

Examples of an outer casing using any of the above-described metals include those having a hermetically sealed structure obtained by welding metal pieces together by laser welding, resistance welding or ultrasonic welding, and those having a caulked structure obtained by using the above-described metals via a resin gasket. Examples of an outer casing using the above-described laminated film include those having a hermetically sealed structure obtained by heat-fusing resin layers together. In order to improve the sealing performance, a resin different from the resin used in the laminated film may be interposed between the resin layers. Particularly, in the case of forming a sealed structure by heat-fusing resin layers via a collector terminal, since it involves bonding between a metal and a resin, a polar group-containing resin or a resin modified by introduction of a polar group is preferably used as the resin to be interposed.

[Protective Element]

Examples of a protective element include a PTC (Positive Temperature Coefficient) element whose resistance increases in the event of abnormal heat generation or excessive current flow, a thermal fuse, a thermistor, and a valve (current cutoff valve) that blocks a current flowing into a circuit in response to a rapid increase in the internal pressure or internal temperature of the battery in the event of abnormal heat generation. The protective element is preferably selected from those that are not activated during normal use at a high current and, from the standpoint of attaining a high output, it is more preferred to design the battery such that neither abnormal heat generation nor thermal runaway occurs even without a protective element.

[Outer Package]

The power storage device of the present invention is usually constructed by housing the above-described non-aqueous electrolyte solution, negative electrode, positive electrode, separator and the like in an outer package. This outer package is not restricted, and any known outer package can be employed as long as it does not markedly impair the effects of the present invention.

Specifically, although the material of the outer package is selected arbitrarily, for example, nickel-plated iron, stainless steel, aluminum or an alloy thereof, nickel, or titanium is usually used.

The shape of the outer package is also selected arbitrarily, and the outer package may have any of, for example, a cylindrical shape, a prismatic shape, a laminated shape, a coin shape, and a large-sized shape.

EXAMPLES

The present invention will now be described more concretely by way of Examples and Reference Examples; however, the present invention is not restricted thereto within the gist of the present invention.

Example 1-1

[Production of Positive Electrode]

$Na_2CO_3$, $Ni_2CO_3$, $Mn_3O_4$, and $Fe_2O_3$ were weighed such that the resulting composite metal compound would have a formulation of $NaNi_{0.3}Mn_{0.3}Fe_{0.4}O_2$, and these materials were dispersed in an ethanol solvent and subsequently wet-pulverized to a median diameter d50 of 0.4 μm or less using Pico Grain Mill (PCM-L, manufactured by Asada Iron Works, Co., Ltd.) to obtain a mixture of metal-containing compounds. It is noted here that, at the time of the weighing, 5% by mole of $Na_2CO_3$ was further added, taking into consideration the loss during the production. The thus obtained mixture was dried by evaporation, loaded to an alumina crucible, and then fired in the air atmosphere at 900° C. for 24 hours using an electric furnace, whereby a composite metal oxide, $O_3$-type $NaNi_{0.3}Mn_{0.3}Fe_{0.4}C_2$, was obtained.

The thus obtained composite metal oxide as a positive electrode active material, an acetylene black (HS-100, manufactured by Denka Co., Ltd.) as a conductive material, and a polyvinylidene fluoride (#7500, manufactured by Kureha Corporation) as a binder were weighed at a mass ratio of 95:5:5 and dispersed in an NMP solvent to obtain a slurry. The thus obtained slurry was applied onto an aluminum foil using a coating machine. The resulting coated polar plate was rolled using a rolling machine, punched out in a rectangular shape of 30 mm×40 mm, and then processed into the state of an electrode, whereby a test electrode was obtained.

[Production of Negative Electrode]

A test electrode was produced using a porous carbon material (LN0010, manufactured by AT Electrode Co., Ltd.) and a copper foil as a negative electrode active material and a current collector, respectively. The above-described porous carbon material as a negative electrode active material, a carbon black (Super P, manufactured by TIMCAL Ltd.) as a conductive material, and a polyvinylidene fluoride (#1120, manufactured by Kureha Corporation) as a binder were weighed at a mass ratio of 95:2:3 and dispersed in an NMP solvent to obtain a slurry. The thus obtained slurry was applied onto a copper foil using a coating machine. The resulting coated polar plate was rolled using a rolling machine, punched out in a rectangular shape of 32 mm×42 mm, and then processed into the state of an electrode, whereby a test electrode was obtained.

[Preparation of Electrolyte Solution]

An electrolyte solution (manufactured by Kishida Chemical Co., Ltd.), in which $NaPF_6$ as an electrolyte was dissolved at a ratio of 1 mol/L in a mixed solvent of ethylene carbonate (EC) and diethyl carbonate (DEC) (volume ratio=30:70), was used as a basic electrolyte solution. Ethylene sulfate (compound (1-1)) in an amount of 1.43 parts by mass was mixed with respect to 100 parts by mass of the mixed solvent to prepare an electrolyte solution of Example 1.

[Battery Production]

A battery element was prepared by laminating the above-obtained positive electrode and negative electrode along with a polypropylene separator in the order of the negative electrode, the separator, and the positive electrode. This battery element was inserted into a pouch made of a laminated film obtained by coating both sides of an aluminum sheet (thickness: 40 μm) with a resin layer, with the terminals of the positive and negative electrodes protruding out of the pouch. Thereafter, the above-prepared electrolyte solution was injected into the pouch, and the pouch was vacuum-sealed, whereby a sheet-form battery of Example 1-1, which would be brought into a fully-charged state at 4.0 V, was produced.

[Battery Evaluation]

The thus obtained sodium ion secondary battery was charged to 4.0 V at 25° C. and a constant current equivalent to 0.1 C, and then discharged to 1.5 V at a constant current of 0.1 C. Two cycles of these operations were performed to stabilize the battery. Subsequently, the battery was charged to 4.0 V at a constant current equivalent to 0.1 C, and the impedance was measured at a temperature of −20° C. with a voltage amplitude of 10 mV and a frequency range of 100,000 Hz to 0.001 Hz. Using an analysis program ZView (ver. 3.2b), the negative electrode resistance and the positive electrode resistance were separated from on the thus obtained results of the impedance measurement. As a durability test, the battery was charged to 4.0 V at 60° C. and a constant current equivalent to 1 C, and then discharged to 1.5 V at a constant current of 1 C. These operations were performed for a total of 100 cycles, and the change in the battery volume was measured based on the Archimedes' principle.

Comparative Example 1-1

A sheet-form battery was produced in the same manner as in Example 1-1 except that the compound (1-1) was not mixed, and the sheet-form battery was evaluated under the same conditions as in Example 1-1.

Comparative Example 1-2

A sheet-form battery was produced in the same manner as in Example 1-1, except that a positive electrode, in which $LiNi_{1/3}Mn_{1/3}Co_{1/3}O$, was used as the positive electrode active material along with a carbon black as the conductive material and a polyvinylidene fluoride as the binder at a mass ratio of 90:7:3, was used and $LiPF_6$ was used as the electrolyte in place of $NaPF_6$. Further, this sheet-form battery was evaluated under the same conditions as in Example 1-1, except that the discharge voltage was changed to 3.0 V.

Comparative Example 1-3

A sheet-form battery was produced in the same manner as in Comparative Example 1-2 except that the compound (1-1) was not mixed, and the sheet-form battery was evaluated under the same conditions as in Example 1-1.

Comparative Example 1-4

A sheet-form battery was produced in the same manner as in Comparative Example 1-2, except that a negative electrode, in which graphite was used as the negative electrode active material along with sodium carboxymethyl cellulose (an aqueous dispersion having a concentration of 1% by mass) as a thickening agent and a styrene-butadiene rubber (an aqueous dispersion having a concentration of 50% by mass) as the binder at a mass ratio of 97.5:1.5:1, was used. This sheet-form battery was evaluated under the same conditions as in Comparative Example 1-2.

Comparative Example 1-5

A sheet-form battery was produced in the same manner as in Comparative Example 1-4 except that the compound (1-1) was not mixed, and the sheet-form battery was evaluated under the same conditions as in Comparative Example 1-2.

Example 1-2

[Production of Positive Electrode]

$Na_2CO_3$, $Ni_2CO_3$, and $Mn_3O_4$ were weighed such that the resulting composite metal compound would have a formulation of $Na_{2/3}Ni_{1/3}Mn_{2/3}O_2$, and these materials were dispersed in an ethanol solvent and subsequently wet-pulverized to a median diameter d50 of 0.4 µm or less using Pico Grain Mill (PCM-L, manufactured by Asada Iron Works, Co., Ltd.) to obtain a mixture of metal-containing compounds. It is noted here that, at the time of the weighing, 10% by mole of $Na_2CO_3$ was further added, taking into consideration the loss during the production. The thus obtained mixture was dried by evaporation, loaded to an alumina crucible, and then fired in the air atmosphere at 1,000° C. for 24 hours using an electric furnace, whereby a composite metal oxide, P2-type $Na_{2/3}Ni_{1/3}Mn_{2/3}O_2$, was obtained. The thus obtained composite metal oxide as a positive electrode active material, an acetylene black (HS-100, manufactured by Denka Co., Ltd.) as a conductive material, and a polyvinylidene fluoride (#7500, manufactured by Kureha Corporation) as a binder were weighed at a mass ratio of 95:5:5 and dispersed in an NMP solvent to obtain a slurry. The thus obtained slurry was applied onto an aluminum foil using a coating machine. The resulting coated polar plate was rolled using a rolling machine, punched out in a rectangular shape of 30 mm×40 mm, and then processed into the state of an electrode, whereby a test electrode was obtained.

[Production of Negative Electrode]

An active carbon material (specific surface area: 1,700 $m^2/g$, average particle size: 10 µm) was heat-treated at 2,100° C. for 1 hour under an argon gas atmosphere in a furnace to obtain a negative electrode active material. This heat-treated active carbon material obtained as a negative electrode active material and a polyvinylidene fluoride (#1120, manufactured by Kureha Corporation) as a binder were weighed at a mass ratio of 9:1 and dispersed in an NMP solvent to obtain a slurry. The thus obtained slurry was applied onto a copper foil using a coating machine. The resulting coated polar plate was rolled using a rolling machine, punched out in a rectangular shape of 32 mm×42 mm, and then processed into the state of an electrode, whereby a test electrode was obtained.

A sheet-form battery was produced in the same manner as in Example 1-1 except that the positive and negative electrodes produced by the above-described methods were used as test electrodes, and the sheet-form battery was evaluated under the same conditions as in Example 1-1.

Example 1-3

A sheet-form battery was produced in the same manner as in Example 1-2 except that an electrolyte solution, in which 1.60 parts by mass of 1,2-propylene sulfate (compound (1-2)) was mixed without the compound (1-1), was used. This sheet-form battery was evaluated under the same conditions as in Example 1-2.

Comparative Example 1-6

A sheet-form battery was produced in the same manner as in Example 1-2 except that the compound (1-1) was not mixed, and the sheet-form battery was evaluated under the same conditions as in Example 1-2.

TABLE 1

| Examples | Positive electrode active material | Negative electrode active material | Additive | Amount (parts by mass) | $NaPF_6$ mol/L | Additive/ $NaPF_6$ molar ratio | Initial resistance ratio | Volume change ratio |
|---|---|---|---|---|---|---|---|---|
| Example 1-1 | $NaNi_{0.3}Mn_{0.3}Fe_{0.4}O_2$ | Porous carbon material | Compound (1-1) | 1.43 | 1.00 | 0.14 | 0.39 | 0.74 |
| Comparative Example 1-1 | $NaNi_{0.3}Mn_{0.3}Fe_{0.4}O_2$ | Porous carbon material | — | — | 1.00 | 0 | 1.00 | 1.00 |
| Comparative Example 1-2 | $LiNi_{1/3}Mn_{1/3}Co_{1/3}O_2$ | Porous carbon material | Compound (1-1) | 1.43 | 0 | — | 1.05 | 1.00 |

TABLE 1-continued

| Examples | Positive electrode active material | Negative electrode active material | Additive | Amount (parts by mass) | NaPF$_6$ mol/L | Additive/ NaPF$_6$ molar ratio | Initial resistance ratio | Volume change ratio |
|---|---|---|---|---|---|---|---|---|
| Comparative Example 1-3 | LiNi$_{1/3}$Mn$_{1/3}$Co$_{1/3}$O$_2$ | Porous carbon material | — | — | 0 | — | 1.00 | 1.00 |
| Comparative Example 1-4 | LiNi$_{1/3}$Mn$_{1/3}$Co$_{1/3}$O$_2$ | Graphite | Compound (1-1) | 1.43 | 0 | — | 1.89 | 0.86 |
| Comparative Example 1-5 | LiNi$_{1/3}$Mn$_{1/3}$Co$_{1/3}$O$_2$ | Graphite | — | — | 0 | — | 1.00 | 1.00 |
| Example 1-2 | Na$_{2/3}$Ni$_{1/3}$Mn$_{2/3}$O$_2$ | Heat-treated activated carbon | Compound (1-1) | 1.43 | 1.00 | 0.14 | 0.55 | — |
| Example 1-3 | Na$_{2/3}$Ni$_{1/3}$Mn$_{2/3}$O$_2$ | Heat-treated activated carbon | Compound (1-2) | 1.60 | 1.00 | 0.14 | 0.61 | — |
| Comparative Example 1-6 | Na$_{2/3}$Ni$_{1/3}$Mn$_{2/3}$O$_2$ | Heat-treated activated carbon | — | — | 1.00 | 0 | 1.00 | — |

Table 1 shows the types of active materials, the type of additive, the resistance ratio, and the volume change ratio for each of the evaluated batteries. The initial resistance ratio represents a ratio of the negative electrode resistance without an additive with respect to the negative electrode resistance with an additive in a battery system using the same positive and negative electrode active materials, and was calculated by the following formula:

[Initial resistance ratio]=[(Negative electrode resistance with additive)/(Negative electrode resistance without additive)]

The volume change ratio represents a ratio of the change in the battery volume without an additive with respect to the change in the battery volume with an additive in a battery system using the same positive and negative electrode active materials, and was calculated by the following formula:

[Volume change ratio]=[(Change in battery volume with additive)/(Change in battery volume without additive)]

In all of Example 1-1 and Comparative Examples 1-1 to 1-3, a porous carbon material was used as a negative electrode active material and, according to the results shown in Table 1, an effect of reducing the negative electrode resistance by an addition of the compound (1-1) was not confirmed in these lithium ion secondary batteries. It is seen, however, that an addition of the compound (1-1) provided an excellent effect of reducing the negative electrode resistance in the sodium ion secondary batteries.

Further, in both Comparative Examples 1-4 and 1-5, NaPF$_6$ was not incorporated and the effects of the present invention were not exerted and, according to the results shown in Table 1, it is seen that an addition of the compound (1-1) tended to increase the negative electrode resistance in these lithium ion secondary batteries in which graphite was used as a negative electrode active material.

In other words, these results indicate that the use of the same compound as an additive has different effects depending on the battery system. With regard to the point that even the same compound has different effects on the negative electrode resistance between a sodium ion secondary battery and a lithium ion secondary battery, the reaction mechanism thereof is not clear; however, it is believed to be of a lithium ion secondary battery system in the initial negative electrode formation process. It is presumed that, in the process of the formation of a negative electrode coating film in a sodium ion secondary battery, the compound (1) reduces the negative electrode resistance by inhibiting the formation of an inorganic coating film.

From a comparison between Example 1-2 and Comparative Example 1-6 in which positive and negative electrode active materials for a sodium secondary battery that are different from those of Example 1-1 were used, it is seen that an addition of the compound (1-1) greatly reduces the negative electrode resistance. From a comparison between Example 1-3 and Comparative Example 1-6, it is seen that the compound (1-2) having a chemical structure similar to that of the compound (1-1) can also provide the same effect.

From the above-described comparisons, a sodium ion secondary battery having a low resistance can be provided by using the non-aqueous electrolyte solution of the present invention for a sodium ion secondary battery.

Example 2-1

[Production of Positive Electrode]

Na$_2$CO$_3$, Ni$_2$CO$_3$, and Mn$_3$O$_4$ were weighed such that the resulting composite metal compound would have a formulation of Na$_{2/3}$Ni$_{1/3}$Mn$_{2/3}$O$_2$, and these materials were dispersed in an ethanol solvent and subsequently wet-pulverized to a median diameter d50 of 0.4 μm or less using Pico Grain Mill (PCM-L, manufactured by Asada Iron Works, Co., Ltd.) to obtain a mixture of metal-containing compounds. It is noted here that, at the time of the weighing, 10% by mole of Na$_2$CO$_3$ was further added, taking into consideration the loss during the production. The thus obtained mixture was dried by evaporation, loaded to an alumina crucible, and then fired in the air atmosphere at 1,000° C. for 24 hours using an electric furnace, whereby a composite metal oxide, P2-type Na$_{2/3}$Ni$_{1/3}$Mn$_{2/3}$O$_2$, was obtained. The thus obtained composite metal oxide as a positive electrode active material, an acetylene black (HS-100, manufactured by Denka Co., Ltd.) as a conductive material, and a polyvinylidene fluoride (#7500, manufactured by Kureha Corporation) as a binder were weighed at a mass ratio of 95:5:5 and dispersed in an NMP solvent to obtain a slurry. The thus obtained slurry was applied onto an aluminum foil using a coating machine. The resulting coated polar plate was rolled using a rolling machine, punched out in a rectangular shape of 30 mm×40 mm, and then processed into the state of an electrode, whereby a test electrode was obtained.

[Production of Negative Electrode]

An active carbon material (specific surface area: 1,700 m$^2$/g, average particle size: 10 μm) was heat-treated at 2,100° C. for 1 hour under an argon gas atmosphere in a furnace to obtain a negative electrode active material. This heat-treated active carbon material obtained as a negative electrode active material and a polyvinylidene fluoride (#1120, manufactured by Kureha Corporation) as a binder were weighed at a mass ratio of 9:1 and dispersed in an NMP solvent to obtain a slurry. The thus obtained slurry was applied onto a copper foil using a coating machine. The resulting coated polar plate was rolled using a rolling machine, punched out in a rectangular shape of 32 mm×42 mm, and then processed into the state of an electrode, whereby a test electrode was obtained.

[Preparation of Electrolyte Solution]

An electrolyte solution was prepared by dissolving ethylene sulfate (compound (1-1)) and $NaPF_6$ in a mixed solvent of ethylene carbonate (EC) and diethyl carbonate (DEC) (volume ratio=30:70) as shown in the row of Example 2-1 in Table 2.

[Battery Production]

A battery element was prepared by laminating the above-obtained positive electrode and negative electrode along with a polyethylene separator in the order of the negative electrode, the separator, and the positive electrode. This battery element was inserted into a pouch made of a laminated film obtained by coating both sides of an aluminum sheet (thickness: 40 μm) with a resin layer, with the terminals of the positive and negative electrodes protruding out of the pouch. Thereafter, the above-prepared electrolyte solution was injected into the pouch, and the pouch was vacuum-sealed, whereby a sheet-form battery of Example 2-1, which would be brought into a fully-charged state at 4.0 V, was produced.

[Battery Evaluation]

The thus obtained sodium ion secondary battery was charged to 4.0 V at 25° C. and a constant current equivalent to 0.1 C, and then discharged to 1.5 V at a constant current of 0.1 C. Two cycles of these operations were performed to stabilize the battery. Subsequently, the battery was charged to 4.0 V at a constant current equivalent to 0.1 C, and the impedance was measured at a temperature of 25° C. with a voltage amplitude of 10 mV and a frequency range of 100,000 Hz to 0.001 Hz to check the resistance of the battery. As a durability test, the battery charged to 4.0 V was stored at 60° C. for one week, and the change in the battery volume was measured based on the Archimedes' principle.

Example 2-2

A sheet-form battery was produced in the same manner as in Example 2-1 except that an electrolyte solution was prepared by dissolving ethylene sulfate (compound (1-1)) and $NaPF_6$ in a mixed solvent of ethylene carbonate (EC) and diethyl carbonate (DEC) (volume ratio=30:70) as shown in the row of Example 2-2 in Table 2, and the sheet-form battery was evaluated under the same conditions as in Example 2-1.

Example 2-3

A sheet-form battery was produced in the same manner as in Example 2-1 except that an electrolyte solution was prepared by dissolving ethylene sulfate (compound (1-1)) and $NaPF_6$ in a mixed solvent of ethylene carbonate (EC) and diethyl carbonate (DEC) (volume ratio=30:70) as shown in the row of Example 2-3 in Table 2, and the sheet-form battery was evaluated under the same conditions as in Example 2-1.

Example 2-4

A sheet-form battery was produced in the same manner as in Example 2-1 except that an electrolyte solution was prepared by dissolving ethylene sulfate (compound (1-1)) and $NaPF_6$ in a mixed solvent of ethylene carbonate (EC) and diethyl carbonate (DEC) (volume ratio=30:70) as shown in the row of Example 2-4 in Table 2, and the sheet-form battery was evaluated under the same conditions as in Example 2-1.

Comparative Example 2-1

A sheet-form battery was produced in the same manner as in Example 2-1 except that an electrolyte solution was prepared by dissolving ethylene sulfate (compound (1-1)) and $NaPF_6$ in a mixed solvent of ethylene carbonate (EC) and diethyl carbonate (DEC) (volume ratio=30:70) as shown in the row of Comparative Example 2-1 in Table 2, and the sheet-form battery was evaluated under the same conditions as in Example 2-1.

Comparative Example 2-2

A sheet-form battery was produced in the same manner as in Example 2-1 except that an electrolyte solution was prepared by dissolving ethylene sulfate (compound (1-1)) and $NaPF_6$ in a mixed solvent of ethylene carbonate (EC) and diethyl carbonate (DEC) (volume ratio=30:70) as shown in Table 2, and the sheet-form battery was evaluated under the same conditions as in Example 2-1.

TABLE 2

| Examples | Compound (1-1) mol/L | $NaPF_6$ mol/L | Compound (1-1)/$NaPF_6$ molar ratio | Compound (1-1) Amount (parts by mass) | Initial resistance ratio | Volume change ratio |
|---|---|---|---|---|---|---|
| Example 2-1 | 0.01 | 1.50 | 0.01 | 0.10 | 0.84 | 0.84 |
| Example 2-2 | 0.10 | 1.00 | 0.10 | 1.10 | 0.74 | 0.34 |
| Example 2-3 | 0.40 | 0.70 | 0.57 | 4.40 | 0.82 | 0.26 |
| Example 2-4 | 1.00 | 0.80 | 1.25 | 10.30 | 0.94 | 0.53 |
| Comparative Example 2-1 | 0.00 | 1.00 | 0.00 | 0.00 | 1.00 | 1.00 |
| Comparative Example 2-2 | 2.00 | 1.00 | 2.00 | 18.70 | 1.24 | 1.13 |

Table 2 shows the amounts in moles of ethylene sulfate (compound (1-1)) and NaPF$_6$, the ethylene sulfate/NaPF$_6$ molar ratio, the initial resistance ratio, and the volume change ratio for each of the evaluated batteries. The initial resistance ratio represents a ratio of the negative electrode resistance without an additive with respect to the negative electrode resistance with an additive in a battery system using the same positive and negative electrode active materials, and was calculated by the following formula:

[Initial resistance ratio]=[(Negative electrode resistance with additive)/(Negative electrode resistance without additive)]

The volume change ratio represents a ratio of the change in the battery volume without an additive with respect to the change in the battery volume with an additive in a battery system using the same positive and negative electrode active materials, and was calculated by the following formula:

[Volume change ratio]=[(Change in battery volume with additive)/(Change in battery volume without additive)]

From the results of Examples 2-1 to 2-4, it is apparent that the battery resistance and the change in the battery volume after the durability test were both smaller than those of Comparative Example 2-1 as long as the value of ethylene sulfate/NaPF$_6$ (molar ratio) was in a specific range. Further, as shown in Comparative Example 2-2, it is seen that, when the value of ethylene sulfate/NaPF$_6$ (molar ratio) was larger than a specific range, the initial resistance was higher and the change in the battery volume after the durability test was larger than in Comparative Example 2-1 where ethylene sulfate was not added. In other words, as long as the molar ratio of ethylene sulfate/NaPF$_6$ is in an appropriate range, a sodium ion secondary battery having a low initial resistance and a small change in the battery volume after a durability test can be provided.

INDUSTRIAL APPLICABILITY

The non-aqueous electrolyte solution for a sodium ion secondary battery according to one embodiment of the present invention and the sodium ion secondary battery according to another embodiment of the present invention can be used in a variety of known applications. Specific examples thereof include: power sources for electric tools and portable electronics such as smartphones; emergency power storage systems for houses and the like; power sources for transport equipment such as electric vehicles; power sources for load leveling; and natural energy storage power sources.

What is claimed is:

1. A sodium ion secondary battery, comprising:
a positive electrode;
a negative electrode comprising a negative electrode active material layer on a current collector; and
an electrolyte solution comprising (i) a non-aqueous solvent, (ii) NaPF$_6$, and (iii) a compound of formula (1):

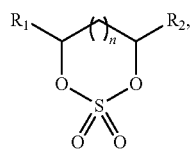

R$_1$ and R$_2$ each being H, and n being 0 or 1,
wherein a (iii)/(ii) molar ratio of a content of (iii) the compound of formula (1) with respect to a content of (ii) the NaPF$_6$ is in a range of from 0.001 to 1.5,
wherein the negative electrode active material layer comprises a negative electrode active material,
wherein the negative electrode active material comprises a porous carbon material,
wherein the porous carbon material has (a) plural closed pores that are not in communication with a surface of the negative electrode active material and (b) a solid portion made of a carbon material, and
wherein the sodium ion secondary battery comprises no added dinitrile.

2. The sodium ion secondary battery of claim 1, wherein the electrolyte solution comprises the compound of formula (1) in a range of from 0.01 to 10 parts by mass, with respect to 100 parts by mass of the non-aqueous solvent.

3. The sodium ion secondary battery of claim 1, wherein the electrolyte solution comprises the NaPF$_6$ in a range of from 0.001 to 5.0 mol/L in the non-aqueous solvent.

4. The sodium ion secondary battery of claim 1, wherein the electrolyte solution comprises a cyclic carbonate as the non-aqueous solvent.

5. The sodium ion secondary battery of claim 1, wherein n in formula (1) is 1.

6. The sodium ion secondary battery of claim 1, wherein n in formula (1) is 0.

7. The sodium ion secondary battery of claim 1, wherein the non-aqueous solvent comprises a saturated cyclic carbonate and a linear carbonate.

8. The sodium ion secondary battery of claim 1, wherein the positive electrode comprises a positive electrode active material of a composite oxide, a polyanionic compound, and/or a fluoride.

9. The sodium ion secondary battery of claim 1, wherein the positive electrode comprises a composite oxide.

10. A sodium ion secondary battery, comprising:
a positive electrode;
a negative electrode comprising a negative electrode active material layer on a current collector; and
an electrolyte solution comprising (i) a non-aqueous solvent, (ii) NaPF$_6$, and (iii) a compound of formula (1):

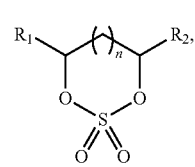

R$_1$ and R$_2$ each being H, and n being 0 or 1,
wherein a (iii)/(ii) molar ratio of a content of (iii) the compound of formula (1) with respect to a content of (ii) the NaPF$_6$ is in a range of from 0.001 to 1.5,
wherein the negative electrode active material comprises a negative electrode active material,
wherein the negative electrode active material comprises a porous carbon material
wherein the porous carbon material has plural closed pores that are not in communication with a surface of the negative electrode active material, and a solid portion made of a carbon material, and
wherein the electrolyte solution comprises no pimelonitrile.

11. The sodium ion secondary battery of claim 1, comprising no cyano-group-comprising agents comprising pimelonitrile.

12. The sodium ion secondary battery of claim 1, comprising no added cyano-group-comprising agents.

13. The sodium ion secondary battery of claim 1, wherein the (iii)/(ii) molar ratio is in a range of from 0.003 to 1.5.

14. The sodium ion secondary battery of claim 1, wherein the (iii)/(ii) molar ratio is in a range of from 0.005 to 1.5.

15. The sodium ion secondary battery of claim 1, wherein the (iii)/(ii) molar ratio is in a range of from 0.14 to 1.4.

16. The sodium ion secondary battery of claim 10, wherein the electrolyte solution comprises the compound of formula (1) in a range of from 0.01 to 10 parts by mass, with respect to 100 parts by mass of the non-aqueous solvent.

17. The sodium ion secondary battery of claim 10, wherein the electrolyte solution comprises the $NaPF_6$ in a range of from 0.001 to 5.0 mol/L in the non-aqueous solvent.

18. The sodium ion secondary battery of claim 10, wherein the electrolyte solution comprises a cyclic carbonate as the non-aqueous solvent.

19. The sodium ion secondary battery of claim 10, wherein n in the formula (1) is 1.

20. The sodium ion secondary battery of claim 10, wherein n in formula (1) is 0.

21. The sodium ion secondary battery of claim 10, wherein the non-aqueous solvent comprises a saturated cyclic carbonate and a linear carbonate.

22. The sodium ion secondary battery of claim 10, wherein the positive electrode comprises a positive electrode active material of a composite oxide, a polyanionic compound, and/or a fluoride.

23. The sodium ion secondary battery of claim 10, wherein the positive electrode comprises a composite oxide.

* * * * *